July 7, 1970 R. F. CAMPBELL 3,519,366
TURBINE DIAPHRAGM SEAL STRUCTURE
Filed May 22, 1968 2 Sheets-Sheet 1
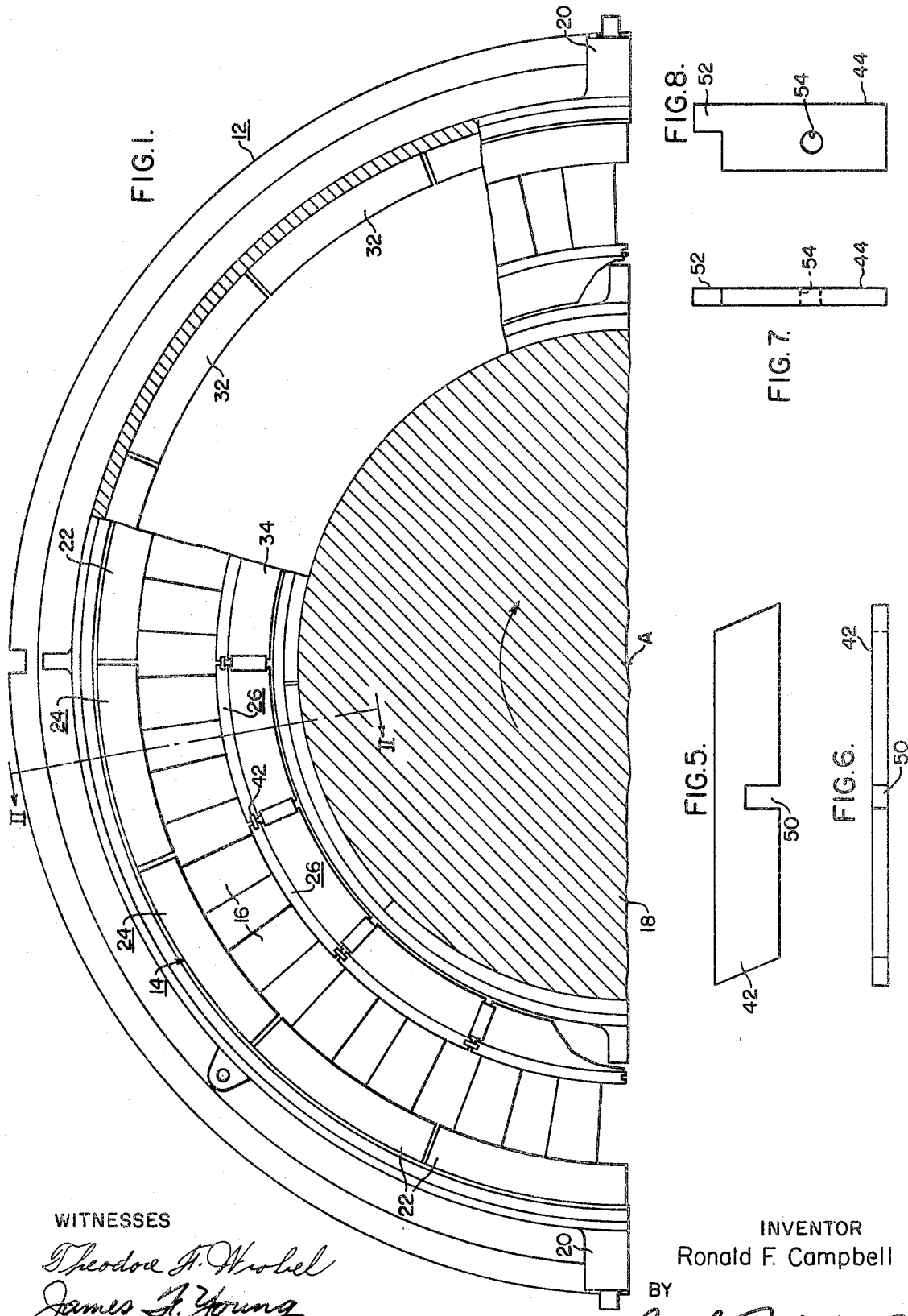
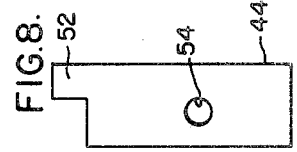
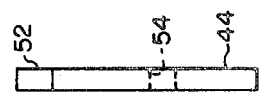
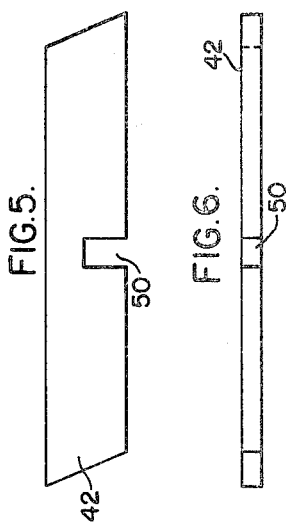
WITNESSES
Theodore F. Wiedel
James F. Young
INVENTOR
Ronald F. Campbell
BY
Frank Catania Jr.

July 7, 1970  R. F. CAMPBELL  3,519,366
TURBINE DIAPHRAGM SEAL STRUCTURE
Filed May 22, 1968  2 Sheets-Sheet 2

United States Patent Office 3,519,366
Patented July 7, 1970

3,519,366
TURBINE DIAPHRAGM SEAL STRUCTURE
Ronald F. Campbell, Ridley Park, Pa., assignor to Westinghouse Electric Corporation, Pittsburgh, Pa., a corporation of Pennsylvania
Filed May 22, 1968, Ser. No. 731,151
Int. Cl. F01d 11/00
U.S. Cl. 415—138          2 Claims

ABSTRACT OF THE DISCLOSURE

A blade ring which supports a diaphragm containing an annular array of stationary vanes or blades of a turbine is divided into two semicircular halves with each half supporting a plurality of diaphragm segments each having outer and inner arcuate shroud segments to which the vanes or blades are secured. Axial and radial seal members at the joints between the inner shroud segments are so interlocked that the radial members retain the axial members in position, and pins in a rib on the shroud retain the radial members in position.

BACKGROUND OF THE INVENTION

This invention relates, generally to elastic fluid machines and, more particularly, to seals for the diaphragms between stages of an axial flow turbine.

In axial flow turbines, the bladed diaphragms between stages of a turbine are provided with annular inner shrouds which encircle the bladed rotor of the turbine and are provided with seal members cooperating with the rotor to minimize leakage of elastic fluid around the turbine blades. A sealing arrangement which permits thermal expansion to occur without stress in the associated components is described in a copending application, Ser. No. 641,565, filed May 26, 1967, by A. J. Scalzo and assigned to the same assignee as this invention.

In elastic fluid machines, such as gas turbines, which are subjected to a relatively high rise in temperature during operation, it is desirable to divide each diaphragm structure into a plurality of segments to accommodate the thermal expansion effects. It is desirable to provide seals at the joints between the segments to minimize leakage of the elastic fluid through the joints.

Accordingly, an object of this invention is to provide axial and radial seal members at the joints between segments of a turbine diaphragm structure which will not interfere with expansion of the components of the structure.

Another object of the invention is to so interlock the axial and the radial seal members that the radial members retain the axial members in position, and each radial member is attached to one of the diaphragm segments.

Other objects of the invention will be explained fully hereinafter or will be apparent to those skilled in the art.

SUMMARY OF THE INVENTION

In accordance with one embodiment of the invention, a turbine diaphragm containing an annular array of stationary vanes or blades is divided into a plurality of segments each having outer and inner arcuate shroud segments between which the vanes or blades are secured. Axially and radially extending seal members are provided to seal the gaps between the joints of the inner shroud segments. The seal members are so interlocked that the radial member retains the axial member in position. Each radial member is attached to one shroud segment by a pin in a rib on the inner shroud.

BRIEF DESCRIPTION OF THE DRAWINGS

For a better understanding of the nature and objects of the invention, reference may be had to the following detailed description, taken in conjunction with the accompanying drawings, in which:

FIG. 1 is a view, partly in elevation and partly in section, of one half of a turbine blade ring and diaphragm assembly embodying principal features of the invention, the other half being similar to the portion shown;

FIGS. 5 and 6 are views in plan and elevation, respectively, of one of the axially extending seal members utilized in the diaphragm, and FIGS. 7 and 8 are views, in end and side elevation, respectively, of one of the radially extending seal members utilized in the diaphragm.

DESCRIPTION OF PREFERRED EMBODIMENT

Figure 2:
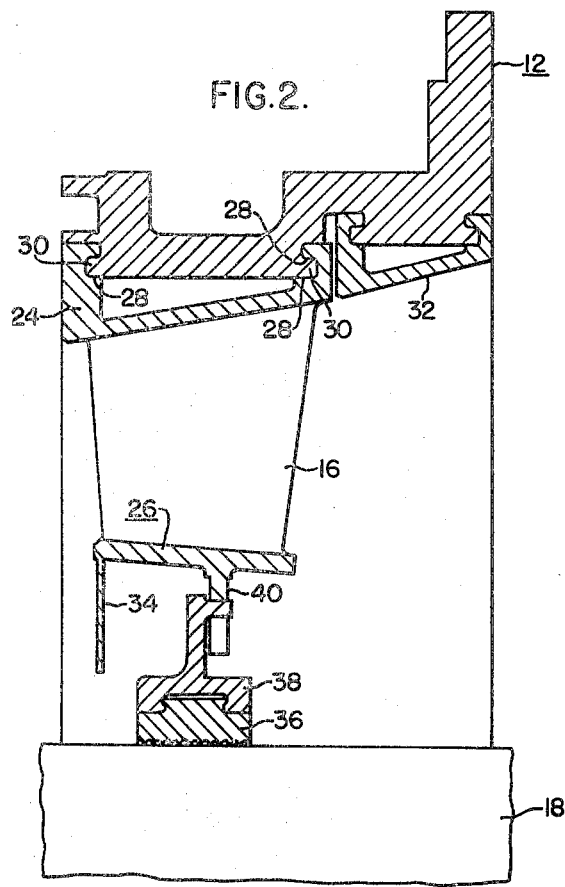
FIG. 2 is an enlarged view, in section, taken along the line II—II in FIG. 1.

Referring to the drawings, particularly to FIGS. 1 and 2, the structure shown therein comprises a blade ring 12 which supports a diaphragm assembly 14 containing an annular array of vanes or blades 16 which encircle a turbine rotor 18 that rotates about the central axis A of the turbine. In a multi-stage turbine, a stationary diaphragm assembly containing stationary blades is provided between the rows or rotor blades which rotate with the rotor. The stationary blades of the diaphragm direct the flow of motive fluid into the rotor blades (not shown), to motivate the rotor in a manner well known in the art. The blade ring 12 is divided into two semi-circular halves, only the upper half being shown in the present drawing. The lower half is similar in structure to the upper half. The two halves are secured together in any suitable manner, for example, by bolts (not shown) which extend through projections 20 and are threaded into corresponding projections on the lower half. The blade ring 12 is mounted inside a turbine casing or cylinder (not shown).

As shown more clearly in FIG. 1, the diaphragm assembly 14 is divided into a plurality of segments 22 disposed in closely spaced relation with each other in annular array. In the present instance the upper half is divided into eight equal segments, hence each segment extends 22.5°. Each segment 22 has an outer arcuate shroud segment 24 and an inner arcuate shroud segment 26 between which the blades 16 are secured.

As shown more clearly in FIG. 2, the outer shroud segments 24 are generally channel-shaped in cross section with grooves 28 provided in opposite sides of the channel for receiving tongues or projections 30 on the blade ring 12, thereby slidably attaching the outer shroud segments to the blade ring. As also shown in FIG. 2, ring segments 32, which are similar in cross section to the shroud segments 24, are attached to the blade ring 12 in a manner similar to the manner in which the shroud segments 24 are attached. The ring segments 32 encircle the rotor blades (not shown).

As described in the aforesaid copending application, the inner shroud segments 26 are provided with inwardly extending flanges 34 and segmented arcuate seal members 36 which cooperate with the rotor to minimize leakage of elastic fluid around the turbine blades. The seal members 36 are carried by housing structures 38 which are attached to radially inwardly extending ribs 40 on the inner shroud segments 26 for radial movement in the manner described in the aforesaid application.

Figure 3:
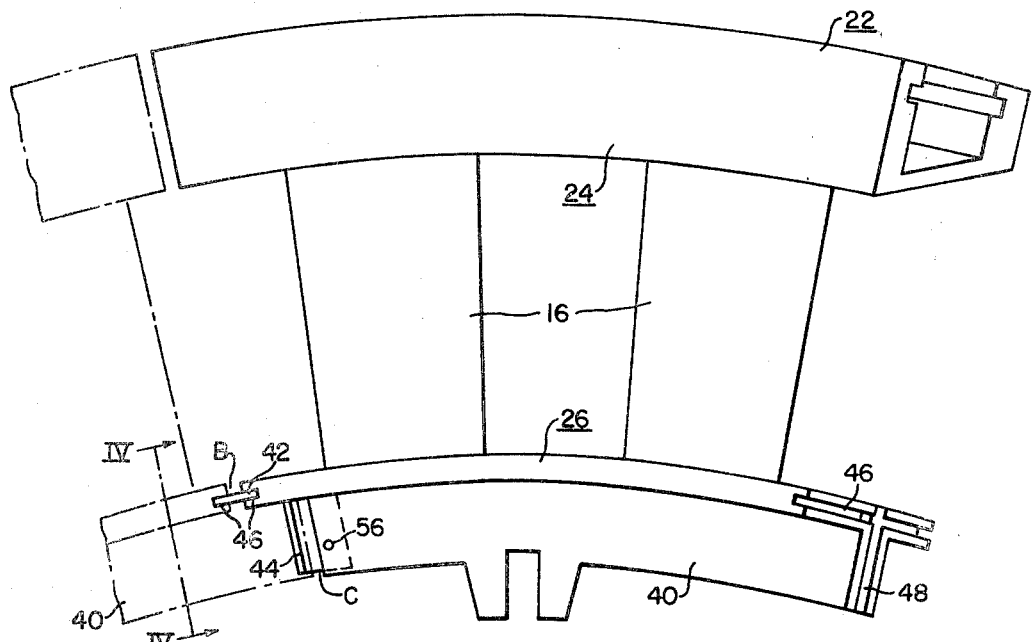
FIG. 3 is an enlarged detail view of one vane segment of the diaphragm.
Figure 4:
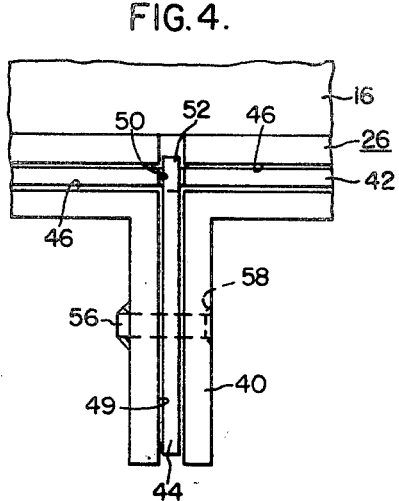
FIG. 4 is an enlarged end view, taken along the line IV—IV in FIG. 3.

In order to minimize the leakage of the elastic fluid through the joints between neighboring arcuate shroud segments 26, an axially extending seal member 42 and a radially extending seal member 44 are provided at each joint as shown more clearly in FIGS. 3 and 4. Each end of each segment 26 has a groove 46 therein for receiving the seal member 42 and a groove 48 therein for receiving the seal member 44. The grooves 46 and 48 intersect with each other at substantially a right angle.

As shown more clearly in FIGS. 5 and 6, the axial seal member 42 is an elongated substantially flat metal strip with a rectangular notch 50 in one edge of the strip. The ends of the strip 42 are cut on a bias, imparting a parallelogram shape to the strip, so as to correspond to the shape of the shroud segment 26, which is also cut on the bias, i.e., inclined at a small angle with respect to the axis A of the turbine.

As shown in FIGS. 7 and 8, the radial seal member 44 is a substantially flat elongated metal strip having a projecting tab 52 at one end of the strip and a circular hole 54 extending through its median portion.

As shown more clearly in FIG. 3, the axial seal member 42 extends across the axial gap B between a pair of neighboring shroud segments 26 and is received in the associated grooves 46. The radial seal member 44 extends across the radial gap C between neighboring ribs 40 on segments 26, and is received in the associated groove 48 as shown in FIG. 4. The tab 52 on the radial seal member 44 extends into the notch 50 in the seal member 42, thereby interlocking the two seal members to retain the axially extending member 42 in position in the grooves 46. A retaining pin 56 extends through an opening 58 in the rib 40 and the opening 54 in the radially extending seal member 44 to retain this member in position in the groove 48. The pin 56 may be secured in position in any suitable manner, as by welding. In this manner the two cooperating seal members 42 and 44 at each joint are retained in position to bridge the gaps B and C between arcuate segments of the inner shroud 26, thereby minimizing leakage of the elastic fluid through the gaps. The axially extending seal members prevent radial flow of elastic fluid and the radially extending seal members prevent axial flow of the elastic fluid.

The seal members are retained in position in a manner which permits thermal expansion of the components of the diaphragm structure. The manner of retaining the seal members also has the advantage of controlled tilt of the axially extending member by varying the amount of clearance between the axial member and the radially extending member.

From the foregoing description it is apparent that the invention provides a sealing arrangement for the gaps at the joints between arcuate segments of a turbine diaphragm structure which permits free expansion of the components of the structure. The two seal members at each joint are interlocked in a manner to retain the members in position in grooves provided in the diaphragm structure for receiving the seal members.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

What is claimed is:
1. In an elastic fluid machine, in combination,
   a blade ring,
   an annular diaphragm comprising an annular array of blades,
   said diaphragm being divided into a plurality of segments received in said blade ring and disposed in closely spaced relation with each other in an annular array thereby forming gaps between neighboring segments,
   each diaphragm segment including an outer arcuate shroud segment and an inner arcuate shroud segment between which blades are secured, the inner shroud segments having radially inwardly extending ribs thereon,
   axially extending seal members disposed between segments of neighboring inner shrouds and extending across said gaps,
   radially extending seal members disposed between segments of neighboring inner shrouds and extending across the gaps between said ribs,
   means for retaining said seal members in position,
   each seal member being an elongated substantially flat metal strip, the axially extending seal members preventing radial flow of elastic fluid and the radially extending seal members prevent axial flow of elastic fluid through the gaps between segments,
   one of the seal members having a notch, and
   the other of the seal members having a projecting tab on one end which extends into the notch and is effective to form an interlock therewith.
2. The combination defined in claim 1, wherein the ends of each axial seal member are cut on a bias imparting a parallelogram shape to the seal member.

References Cited
UNITED STATES PATENTS

| | | |
|---|---|---|
| 2,859,934 | 11/1958 | Halford et al. |
| 3,393,894 | 7/1968 | Redsell. |
| 3,412,977 | 11/1968 | Moyer et al. |

FOREIGN PATENTS

| | | |
|---|---|---|
| 1,020,900 | 2/1966 | Great Britain. |

EVERETTE A. POWELL, JR., Primary Examiner